United States Patent
Hrovat et al.

(10) Patent No.: US 7,140,619 B2
(45) Date of Patent: Nov. 28, 2006

(54) ROLL OVER STABILITY CONTROL FOR AN AUTOMOTIVE VEHICLE HAVING AN ACTIVE SUSPENSION

(75) Inventors: Davorin David Hrovat, Ann Arbor, MI (US); Hongtei Eric Tseng, Canton, MI (US); Michael Glenn Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 09/864,831

(22) Filed: May 24, 2001

(65) Prior Publication Data

US 2004/0041358 A1    Mar. 4, 2004

(51) Int. Cl.
*B60G 17/005* (2006.01)
(52) U.S. Cl. .................................. 280/5.502
(58) Field of Classification Search ............ 280/5.502, 280/5.5, 5.504, 5.506, 5.507, 5.508, 5.51
See application file for complete search history.

(56) References Cited

U.S. PATENT DOCUMENTS

| | | | |
|---|---|---|---|
| 4,712,807 A | 12/1987 | Kurosawa | |
| 4,821,191 A | 4/1989 | Ikemoto et al. | |
| 4,903,983 A | 2/1990 | Fukushima et al. | |
| 5,046,008 A | 9/1991 | Dieter | |
| 5,066,041 A | 11/1991 | Kindermann et al. | |
| 5,087,068 A | 2/1992 | Fukanaga et al. | |
| 5,113,345 A | 5/1992 | Mine et al. | |
| 5,154,443 A | 10/1992 | Takehara et al. | |
| 5,291,406 A | 3/1994 | Williams et al. | |
| 5,438,515 A * | 8/1995 | Miichi et al. | 701/36 |
| 5,475,593 A | 12/1995 | Townend | |
| 5,684,698 A | 11/1997 | Fujii et al. | |
| 5,941,920 A * | 8/1999 | Schubert | 701/37 |
| 5,948,027 A | 9/1999 | Oliver, Jr. et al. | |
| 6,000,702 A | 12/1999 | Streiter | |
| 6,000,703 A | 12/1999 | Schubert et al. | |
| 6,065,558 A * | 5/2000 | Wielenga | 180/282 |
| 6,088,637 A | 7/2000 | Acker et al. | |
| 6,179,310 B1 * | 1/2001 | Clare et al. | 280/124.159 |
| 6,182,783 B1 * | 2/2001 | Bayley | 180/282 |
| 6,263,261 B1 * | 7/2001 | Brown et al. | 701/1 |
| 6,338,012 B1 * | 1/2002 | Brown et al. | 701/1 |
| 6,529,803 B1 * | 3/2003 | Meyers et al. | 701/1 |
| 2002/0139599 A1 * | 10/2002 | Lu et al. | 180/282 |

FOREIGN PATENT DOCUMENTS

EP    1234741 A2 *   8/2002

\* cited by examiner

*Primary Examiner*—Faye M. Fleming
(74) *Attorney, Agent, or Firm*—Fredrick V. Owens

(57) ABSTRACT

A stability control system (24) for an automotive vehicle as includes a plurality of sensors (28–37) sensing the dynamic conditions of the vehicle to determine imminent rollover. A controller (26) coupled to an active suspension (49) controls a restoring torque in response to the rollover signal by controlling the active suspension.

22 Claims, 3 Drawing Sheets

Objective:
To reverse sign of $m\Delta Z = (F - mg)\Delta t$

ROLL OVER STABILITY CONTROL FOR AN AUTOMOTIVE VEHICLE HAVING AN ACTIVE SUSPENSION

TECHNICAL FIELD

The present invention relates generally to a dynamic behavior control apparatus for an automotive vehicle, and more specifically, to a method and apparatus for controlling rollover of the vehicle using an active suspension by changing a suspension position.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address rollover of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the vehicle body on a plane or nearly on a plane parallel to the road surface. Roll over control is maintaining the vehicle wheels on the road surface. One system of tilt control is described in U.S. Pat. No. 5,066,041. The '041 patent uses control elements arranged between the vehicle wheel suspension members and the vehicle body to generate forces in a vertical direction. The control elements generate a rolling moment at the vehicle body counteracting the rolling motion caused by driving conditions. The rolling moment distribution is controlled between the front axle and the rear axle.

U.S. Pat. No. 5,046,008 is a similar device to that described in the '041 patent. This device is also specifically directed to minimizing the roll angle of the vehicle body using adjustable spring struts.

During certain vehicle maneuvers, the vehicle may not be in a turning or yawing condition but may be in a rollover condition. This situation may occur during a trip event. A trip event may occur when the vehicle slides laterally into an object such as a curb. Such a system does not address preventing rollover in a vehicle.

It would therefore be desirable to provide a roll stability system that detects a potential rollover condition as well as to provide a system not dependent upon a yaw condition.

SUMMARY OF THE INVENTION

A rollover control system for use in a vehicle that is provided that generates a restoring torque by controlling an active suspension.

In one aspect of the invention, a method of controlling rollover stability of a vehicle having a first side suspension and a second side suspension comprises the steps of:

sensing imminent rollover of the vehicle in response to a rollover signal;

determining a loading side and a unloading of the vehicle;

unloading the first side suspension corresponding to the unloading side suspension;

loading the second side suspension corresponding to the loading side suspension; and generating a restoring torque in response to the steps of unloading and loading.

One advantage of the invention is that the system may be used in conjunction with a brake actuated rollover control system of a steering actuated rollover control system.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
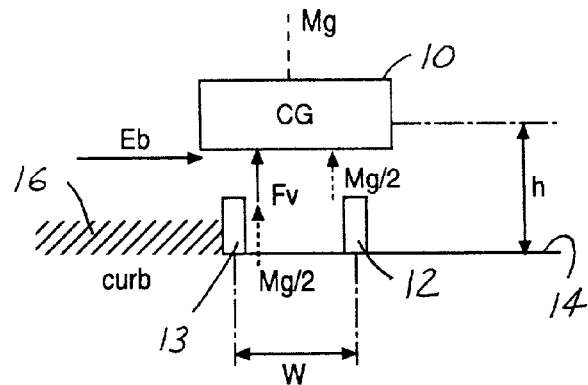
FIG. 1 is a diagrammatic rear view of a vehicle with force vectors having a roll stability system according to the present invention.

Referring to FIG. 1, an automotive vehicle 10 without a rollover stability system of the present invention is illustrated with the various forces and moments thereon during a rollover condition. Vehicle 10 has right and left sides when viewed longitudinally with tires 12 and 13 respectively. Generally, the vehicle has a weight represented as M*g at the center of gravity of the vehicle which is distributed on the right and left side tires 12, 13 as (M*g)/2. The distance between the tires is W. The distance from ground 14 to the center of gravity is h. The invention is particularly useful for use to prevent rollover in both tripped an untripped conditions. To represent a tripped condition, a curb 16 has been illustrated which produces a lateral horizontal force $F_h$. The present invention is used to provide a vertical force $F_v$.

Figure 2:
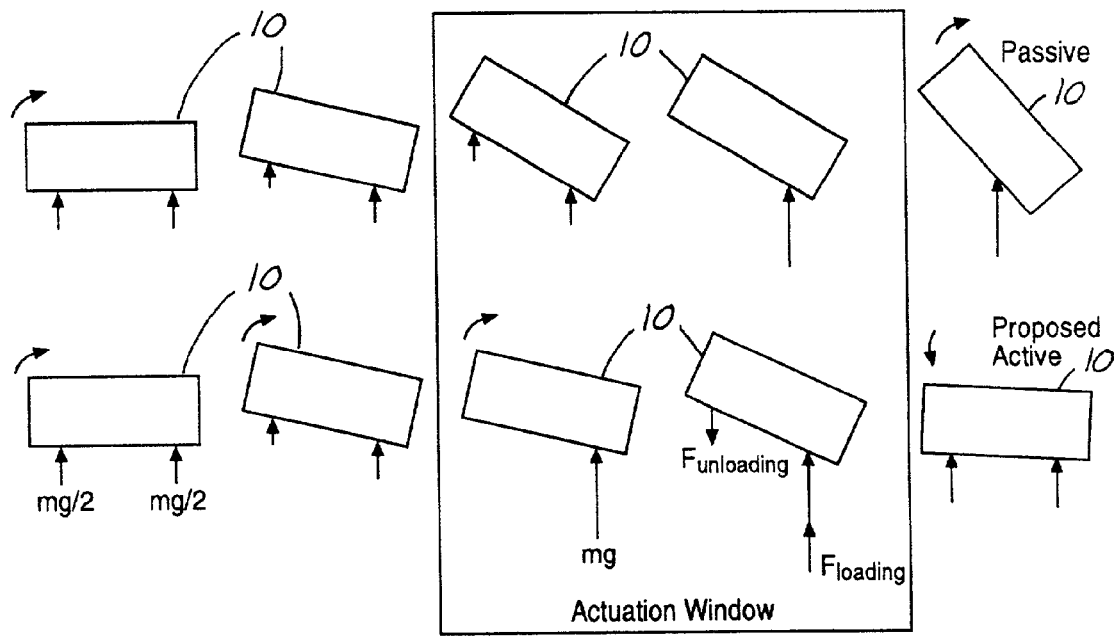
FIG. 2 is a frame-by-frame view of a vehicle rolling over with an active suspension compared to that having an active suspension controlled according to the present invention.

Referring now to FIG. 2, a comparison of the reaction forces between a conventional passive suspension and a vehicle with an active suspension according to the present invention is illustrated. As can be seen in the passive case rollover occurs. In the active case of the present invention, by controlling an active suspension within situation window 17, forces $F_{unloading}$ and $F_{loading}$ are applied to respective sides of the vehicle. In the following example the unloading side is the side of the vehicle raised or in which the suspension is being unloaded. The loading side is the side of the vehicle in which the suspension is being loaded or bearing more weight.

Figure 3:
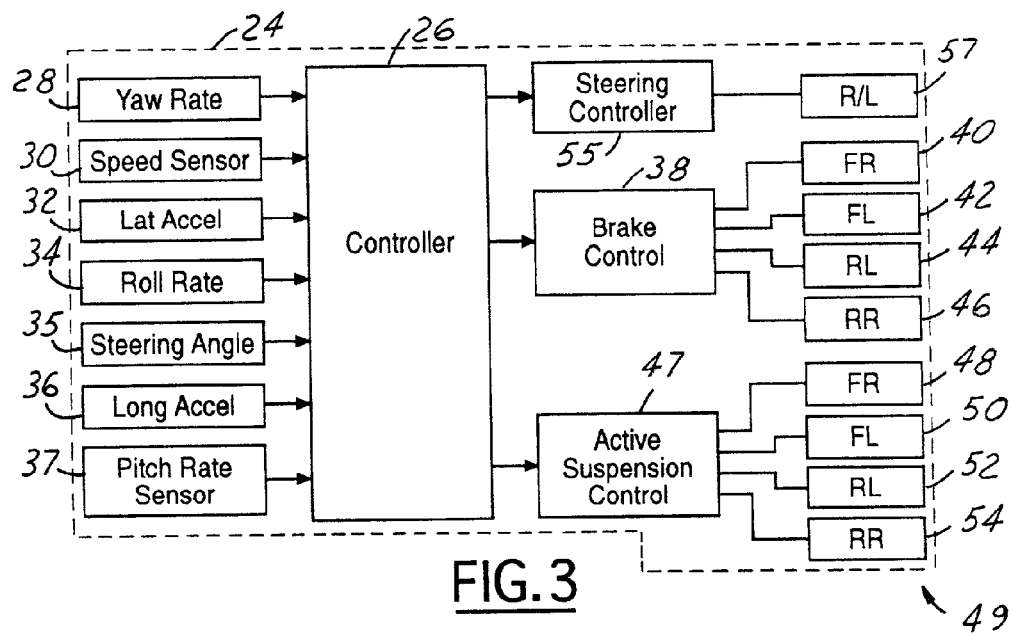
FIG. 3 is a block diagram of a roll stability system according to the present invention.

Referring now to FIG. 3, a roll stability control system 24 is included within vehicle 10, which is in a roll condition. The forces illustrated in FIG. 2 are given the same reference numerals as the forces and moments in FIG. 1. In FIG. 2, however, roll stability controller 24 reduces the rollover forces to reduce imminent rollover. Thus, the tire vector or lateral forces at tire 12 is reduced as well. This tendency allows the vehicle to tend toward the horizontal.

Roll stability control system 24 has a controller 26 used for receiving information from various vehicle condition sensors that alone or in combination form a rollover sensor. The rollover sensor may include but is not limited to a yaw rate sensor 28, a speed sensor 30, a lateral acceleration sensor 32, a roll rate sensor 34, a steering wheel angle sensor 35, a longitudinal acceleration sensor 36 and a pitch rate sensor 37. Lateral acceleration, roll orientation and speed may be obtained using a global positioning system (GPS). Based upon inputs from the sensors, controller 26 controls the rollover forces. The rollover forces may be modified by brake control 38. As will be further described below, changing the steering angle or a combination of brake and steering control may also be used. Depending on the desired sensitivity of the system and various other factors, not all the sensors 28–37 may be used in a commercial embodiment.

There are many possible ways to measure, estimate or infer the roll and pitch condition of the vehicle. The roll rate sensor 34 and pitch rate sensor 37 may be replaced with a number of other vehicle measurements or combinations of measurements.

Roll rate sensor 34 and pitch rate sensor 37 may determine the roll condition of the vehicle based, in part, on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components which may include a linear height or travel sensor or a rotary height or travel sensor.

Roll rate sensor 34 and pitch rate sensor 37 may also sense the roll condition based on the preceding position measurements or other inertial measurements combined with wheel speed sensors used to look for abnormal changes in one or more wheel velocities that may indicate a zero normal load on the tires.

Roll rate sensor 34 and pitch rate sensor 37 may also sense the roll condition based on one of the preceding position measurements or other inertial measurements combined with a driver heading command input from an electronic component that may include steer by wire using a hand wheel or joy stick.

The potential of a roll condition is associated with a zero normal load or a wheel lift condition on one or more of the wheels. A zero normal load, and thus a roll condition may be determined by sensing the force or torque associated with the loading condition of one or more suspension or chassis components including a pressure transducer in a suspension actuator. Similarly, a load cell or a strain gauge may be mounted to measure the force in a suspension component. The zero normal load condition may be used alone or in combination with other displacement or inertial measurements to accurately monitor the vehicle roll condition.

The power steering system actuation can be monitored to infer the normal load on the steered wheels. The steering load can be monitored by measuring one or more of the absolute or relative motor load, the steering system pressure of the hydraulic lines, tire lateral force sensor or sensors, a longitudinal tire force sensor(s), vertical tire force sensor(s) or tire sidewall torsion sensor(s). The steering system measurements used depend on the steering system technology and the sensors available on the vehicle.

The roll condition of the vehicle may also be established by one or more of the following translational or rotational positions, velocities or accelerations 0of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed or proximity sensor, a sonar-based speed or proximity sensor, a laser-based speed or proximity sensor or an optical-based speed or proximity sensor.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. For example, if speed is determined while speeding up or braking around a corner, the lowest or highest wheel speed may not be used because of its error.

Brake control 38 controls the front right brake 40, the front left brake 42, the rear left brake 44, and the right rear brake 46. Based on the inputs from sensors 28 through 34, controller 26 determines a roll condition and controls the brake force of the brakes on the appropriate side of the vehicle. The braking force is balanced on the side of the vehicle to be controlled between the front and rear brakes to minimize the induced yaw torque and induced path deviation. The yaw rate sensor 28 generates a raw yaw rate signal.

In the preferred embodiment, if brake control (or steering direction) is not appropriate or does not counteract roll forces, active suspension control 47 controls the active suspension 49 and associated components corresponding to their location on the vehicle. That is, active suspension control 47 controls the front right component 48, front left component 50, rear left component 52 and rear right component 54.

A steering controller 55 coupled to a steering actuator 57 may also be coupled to controller 26. Steering controller 55 may also be used to generate a restoring torque in addition to suspension control by controlling the steering actuator 57. Steering controller 55 may also be used alone with the suspension control 47. As will be further mentioned below, the suspension may be used without brake or steering control as well. That is, the active suspension control may be used alone to control rollover and provide a restoring torque.

Active suspension 49 may comprise one of several types or combination of types of systems. Active suspension 49, for example, may include an electrical active suspension using electric motors to extend or retract the suspension. Also, active suspension 49 may include hydraulic type components which use hydraulic fluid to expand and retract the suspension.

It is possible to write a sum of the torque's equation around the center of gravity (CG):

$$\sum \tau = F_h \cdot h - F_v \cdot (w/2) \cong 0 \quad (1)$$
$$\rightarrow \quad F_v \cdot h = F_v \cdot (w/2)$$

Thus, by applying an active suspension force $F_v$, it is possible to prevent rollovers for a large impact force $F_h$, such as that provided by curve 16. Thus, if $F_v$=mg and w/2h=1.2, then an additional impact force of 1.2 mg can be tolerated using an active suspension. Typically, the w/2h is between 1.1 and 1.7 for most cars. For heavy trucks this threshold is typically 0.4 to 0.6. Thus, the above equations now become:

$$\frac{a}{g+F_v/m} = \frac{W}{2h} \quad (2)$$

Thus as can be seen, when $F_v$ is mg the rollover threshold has been increased by 100 percent. As those skilled in the art will recognize, this type of system also applies to non-tripped rollovers and can be used therefor.

When using an active suspension, the maximum stroke length of the suspension must also be taken into consideration. For example, if a maximum force capability is m*g (on one side of the vehicle, and the maximum stroke length s equals 0.2 meters, the m*g force can be applied for approximately 0.2 seconds where time=sqrt(2)s/g. This duration may be too short depending on $F_h$. The need for such a high magnitude of restoring torque may not be required. Therefore, a smaller force having a longer duration may also be used. These types of parameters will vary from vehicle to vehicle. Therefore, the teachings of the present invention may be applied and tested in a real world situation to determine optimum times, durations and amounts of force to be applied to the suspension.

Another way of restating the above is:

$$m\Delta Z = (F - mg)\Delta \tau / \quad (3)$$

$$\Delta p = [(F_{unloading} - F_{loading}) * (TrackWidth/2) * \cos(\varphi)]\Delta \tau$$

$Z$: sprung mass displacement $p$: roll velocity $\varphi$: roll angle

That is, it is the goal to reduce the sign of the roll velocity p and the sprung mass displacement.

In the following description, "unloading" and "wheel" is used to refer to the side of the vehicle where the passive suspension, after a trip event, would unload the wheel due to rollover energy. The object of the invention is to compress the suspension on the unloading side of the vehicle as much as possible and reduce the length of the sprung mass on this side. That is, the passive suspension is preferably retracted on the unloading side. Of course, the duration and length of the retracting motion may be limited due to reaching the jounce limit.

The "loading" wheel is the side of the passive suspension which after a trip event would load the wheel due to rollover energy. The present invention seeks to extend the passive suspension on the loading side of the vehicle as much as possible to extend the sprung mass and stabilize the rolling momentum by providing a restoring torque. The force in this direction is limited by heave dynamics and suspension travel as well. As can be observed, if vehicle dynamics do not allow a desired amount of unloading or loading, the amount of the restoring torque provided by the opposite unloading or loading side may be increased. It should be noted that the effective torque arm of the vehicle is (track_width)/2*cos (roll_angle). The effective torque arm is much larger at the initial stage of a rollover event when the roll angle is small.

Figure 4:
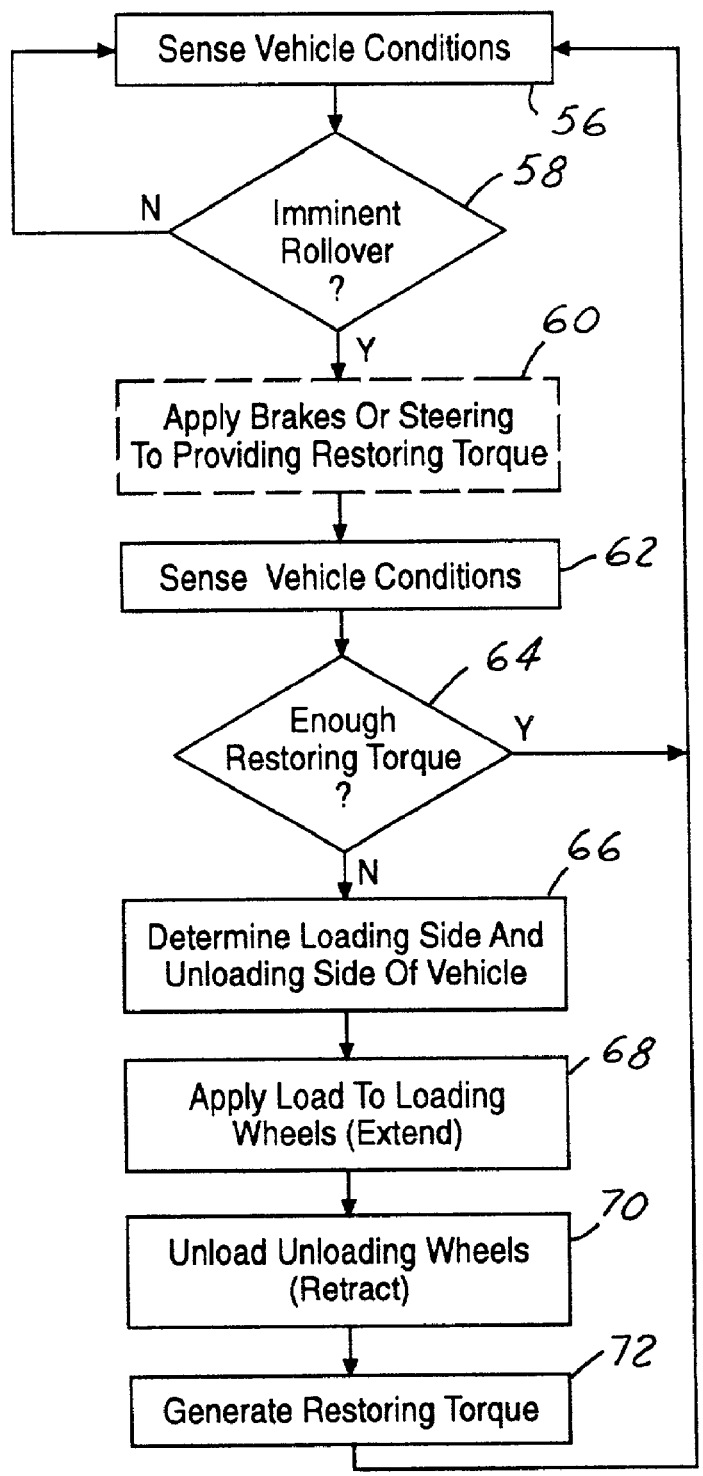
FIG. 4 is a flow chart of a preferred method for operating a rollover stability system according to the present invention.

Referring now to FIG. 4, the vehicle conditions are sensed to determine whether rollover is imminent. Various sensors may be used, as described above, for determining the rollover propensity. In step 58, if rollover is not imminent based upon the sensed vehicle conditions, step 56 is repeated. If rollover is imminent based upon the sensed vehicle conditions, step 60 is executed in which brakes or steering are applied to provide a restoring torque. As mentioned above, the force on the brakes on the side of the vehicle may be used to reduce tire forces and thus provide some restoring torque. However, in certain conditions such application of brakes or steering may not provide enough restoring torque. After step 60, step 62 is executed which monitors the sensed vehicle conditions and step 64 thus determines if enough restoring torque is being applied by the brakes or steering. If enough restoring torque is provided, step 56 is executed. If in step 64 enough restoring torque is not provided, the loading side and unloading side of the vehicle is determined. As mentioned above, the loading side of the vehicle is the side of the vehicle that is being loaded with the weight of the vehicle due to the imminent rollover event.

In step 68, a load is applied to the loading wheels. That is, a load is applied to extend the suspension components on the loading side of the vehicle. Typically, the front and rear of the loading side of the vehicle will be applied simultaneously to provide effective results. Applying a load causes the suspension to extend on the loading side of the vehicle so that the sprung mass stabilizes the rolling momentum and provides a restoring torque.

In addition to step 68, step 70 also provides a restoring torque by unloading the unloading wheels of the vehicle. That is, the suspension on the unloading side of the vehicle is retracted or compressed to pull down the sprung mass on the unloading side. In step 72, the culmination of steps 68 and 70 provide a restoring torque to maintain the vehicle in an upright position. After step 72, step 56 is repeated.

It should be noted that steps 60 through 64 are optional steps. These steps illustrate that the present invention may be part of a more complex control system for an automotive vehicle. However, steps 60 through 64 may also be eliminated if suspension control alone is desired. It should be also noted that preferably steps 68 and 70 are performed simultaneously to provide a restoring torque. Because both of the restoring torques act together, the loading and unloading of the suspension takes place simultaneously. Also, to reduce the time for generating the restoring torque, step 68 is preferably applied to fully extend the passive suspension on the loading side of the vehicle while step 70 is preferably performed to fully unload the unloading wheels and therefore retract the suspension on the unloading side of the vehicle. That is, the unloading side of the vehicle is preferably retracted to a fully jounced position while the loading side of the wheel of the vehicle is preferably placed in a fully rebounded position.

Figure 5:
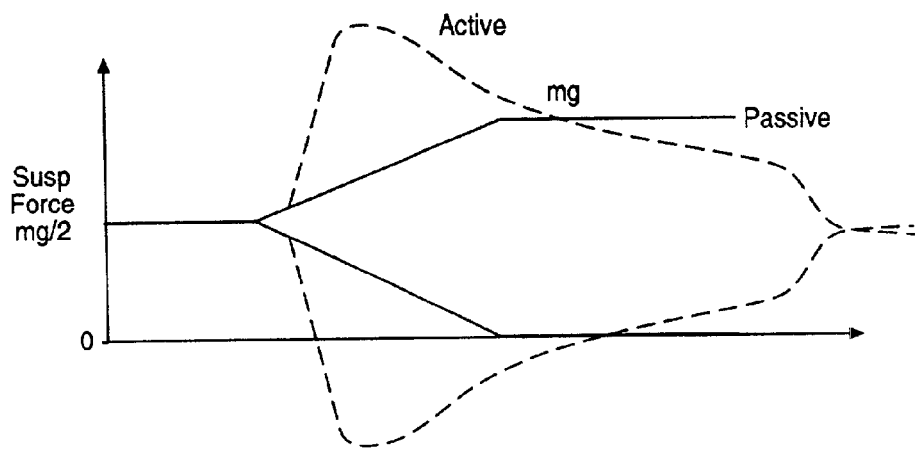
FIG. 5 is a plot of suspension force over time for a passive suspension system and an active suspension system according to the present invention.

Referring now to FIG. 5, as can be seen the active suspension force of the present invention is compared to a passive suspension system. As can be seen, a large suspension force is provided by the present invention.

Figure 6:
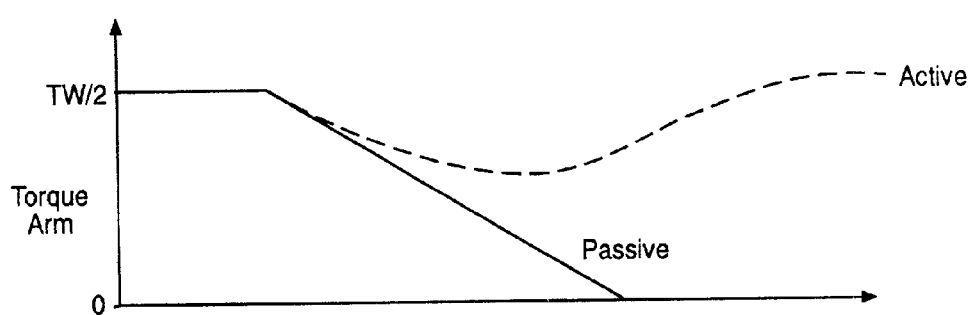
FIG. 6 is a plot of the length of a torque arm versus time of a passive suspension system and an active suspension system according to the present invention.

Referring now to FIG. 6, the torque arm of an active suspension is plotted and compared to a passive suspension system used commonly in vehicles. As can be seen, the active suspension of the present invention has a greater torque arm and thus the propensity of the vehicle to overturn is reduced.

While particular embodiments of the invention have been shown and described, numerous variations and alternate embodiments will occur to those skilled in the art. Accordingly, it is intended that the invention be limited only in terms of the appended claims.

What is claimed is:

1. A rollover control system for an automotive vehicle comprising:
   an active suspension having an independently adjustable unloading side and a an independently adjustable loading side;
   a rollover sensor generating a rollover signal in response to an imminent rollover of the vehicle; and
   a controller coupled to said rollover sensor for controlling the active suspension to generate a restoring torque in response to the rollover signal.

2. A rollover control system as recited in claim 1 whereIn said controller controls the loading side to a loaded condition and controls the unloading side to an unloaded condition to provide the restoring torque.

3. A rollover control system as recited in claim 1 wherein said controller controls the loading side to a loaded condition and simultaneously controls the unloading side to an unloaded condition to provide the restoring torque.

4. A rollover control system as recited in claim 1 wherein said rollover sensor comprises a speed sensor generating a first signal corresponding to wheel speed of the vehicle.

5. A rollover control system as recited in claim 1 wherein said rollover sensor is selected from the group of a speed sensor, a lateral acceleration sensor, a roll rate sensor, a yaw rate sensor and a longitudinal acceleration sensor.

6. A rollover control system as recited in claim 1 wherein said rollover sensor is selected from the group of a speed sensor, a lateral acceleration sensor, a roll rate sensor, a yaw rate sensor and a steering wheel angle sensor.

7. A rollover control system as recited in claim 1 further comprising a sensor selected from the group of a steering angle sensor, acceleration sensor and a pitch rate sensor.

8. A rollover control system as recited in claim 1 wherein said controller determines vehicle speed at a center of gravity of the vehicle in response to a steering angle from a steering sensor.

9. A rollover control system as recited in claim 1 further comprising a brake controller coupled to said controller, said brake controller controlling front brake force and rear brake force in response to said rollover signal.

10. A rollover control system as recited in claim 9 wherein said controller changes the restoring torque by changing a steering angle factor in combination with a brake force distribution.

11. A rollover control system as recited in claim 1 wherein said controller changes the restoring torque by controlling steered wheels.

12. A method of controlling rollover stability of a vehicle having an active suspension having a first side suspension and a second side suspension comprising the steps of:
   sensing imminent rollover of the vehicle and generating a rollover signal in response thereto;
   generating a restoring torque in response to the rollover signal by controlling the active suspension.

13. A method as recited in claim 12 wherein the step of generating a restoring torque comprises unloading the first side suspension.

14. A method as recited in claim 12 wherein the step of generating a restoring torque comprises loading the second side suspension corresponding to the loading side suspension.

15. A method as recited in claim 12 wherein the step of generating a restoring torque comprises generating a restoring torque in response to the rollover signal by controlling the active suspension and a brake force distribution.

16. A method as recited in claim 12 wherein the step of generating a restoring torque comprises generating a restoring torque in response to the rollover signal by controlling the active suspension and a steering angle.

17. A method as recited in claim 12 wherein the step of generating a restoring torque comprises simultaneously unloading the first side suspension and loading the second side suspension corresponding to the loading side suspension.

18. A method of controlling rollover stability of a vehicle having a first side suspension and a second side suspension comprising the steps of:
   sensing imminent rollover of the vehicle and generating a rollover signal in response thereto;
   determining a loading side and an unloading side of the vehicle in response to the rollover signal;
   unloading the first side suspension corresponding to the unloading side suspension;
   loading the second side suspension corresponding to the loading side suspension;
   generating a restoring torque in response to the steps of unloading and loading to counter the imminent rollover.

19. A method as recited in claim 18 wherein prior to the step of loading and unloading generating the restoring torque by changing a steering angle of the vehicle.

20. A method as recited in claim 18 wherein prior to the step of loading and unloading generating the restoring torque by changing a brake force distribution.

21. A method as recited in claim 18 wherein prior to the step of loading and unloading generating the restoring torque by changing a steering angle factor in combination with a brake force distribution.

22. A method as recited in claim 18 wherein the steps of loading and unloading are performed simultaneously.

* * * * *